US008634616B2

(12) United States Patent
Den Harder et al.

(10) Patent No.: US 8,634,616 B2
(45) Date of Patent: Jan. 21, 2014

(54) METHOD, APPARATUS, AND COMPUTER PROGRAM PRODUCT FOR ACQUIRING MEDICAL IMAGE DATA

(75) Inventors: Johan Michiel Den Harder, Eindhoven (NL); Arianne Van Muiswinkel, Eindhoven (NL); Stewart Young, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 306 days.

(21) Appl. No.: 13/131,321

(22) PCT Filed: Nov. 30, 2009

(86) PCT No.: PCT/IB2009/055404
§ 371 (c)(1),
(2), (4) Date: May 26, 2011

(87) PCT Pub. No.: WO2010/064187
PCT Pub. Date: Jun. 10, 2010

(65) Prior Publication Data
US 2011/0229005 A1   Sep. 22, 2011

(30) Foreign Application Priority Data
Dec. 4, 2008   (EP) .................................. 08170697

(51) Int. Cl.
*G06K 9/00*   (2006.01)
(52) U.S. Cl.
USPC .............................. 382/128; 128/922; 378/4
(58) Field of Classification Search
USPC ......... 382/100, 128, 129, 130, 131, 132, 133; 128/922; 378/4–27
See application file for complete search history.

(56) References Cited

U.S. PATENT DOCUMENTS

| 7,242,794 B2* | 7/2007 | Imamura et al. | 382/128 |
|---|---|---|---|
| 7,876,938 B2* | 1/2011 | Huang et al. | 382/128 |
| 8,265,355 B2* | 9/2012 | Zhao et al. | 382/128 |
| 2004/0252870 A1* | 12/2004 | Reeves et al. | 382/128 |
| 2005/0018890 A1* | 1/2005 | McDonald et al. | 382/128 |
| 2006/0159342 A1* | 7/2006 | Sun et al. | 382/173 |
| 2007/0081712 A1 | 4/2007 | Huang et al. | |
| 2007/0276221 A1* | 11/2007 | Warntjes | 600/410 |
| 2008/0103383 A1* | 5/2008 | van der Kouwe et al. | 600/410 |

FOREIGN PATENT DOCUMENTS

| WO | 2006054267 A1 | 5/2006 |
|---|---|---|
| WO | 2008062415 A2 | 5/2008 |

OTHER PUBLICATIONS

Marcel Prastawa et al: "Automatic Segmentation of MR Images of the Developing Newborn Brain"; Medical Image Analysis 9, 2005, pp. 457-466.
Tien Dung Nguyen et al: "Surface Extraction Using SVM-Based Texture Classification for 3D Fetal Ultrasound Imaging"; IEEE First International Conference on Communications and Electronics, ICCE '6, Oct. 2006, pp. 285-290.
John (Juyang) Weng et al: "Learning-Based Ventricle Detection From Cardiac MR and CT Images"; IEEE Transactions on Medical Imaging, Aug. 1997, vol. 16, No. 4, pp. 378-391.
Erol Sarigul: "Interactive Machine Learning for Refinement and Analysis of Segmented CT/MRI Images"; Thesis From Virginia Polytechnic Institute, 2004, 197 Pages.

* cited by examiner

*Primary Examiner* — Anand Bhatnagar

(57) ABSTRACT

A method of acquiring medical image data with at least one region of interest with a predefined freely shaped geometry comprising the following steps: acquiring a first set of medical image data, identifying at least one anatomical landmark in the first set of image data, determining the at least one region of interest with a trained pattern recognition module using the at least one anatomical landmark.

12 Claims, 5 Drawing Sheets

METHOD, APPARATUS, AND COMPUTER PROGRAM PRODUCT FOR ACQUIRING MEDICAL IMAGE DATA

FIELD OF THE INVENTION

The invention relates to medical imaging, in particular it relates to the automatic identification of regions of interest within medical images.

BACKGROUND OF THE INVENTION

Medical imaging technologies such as Magnetic Resonance Imaging (MRI), Computed Tomography (CT), or Positron Emission Tomography (PET) are able to acquire information about the physical structure of a patient and construct two dimensional or three dimensional data sets. These data sets can then be used to construct visualizations of the data sets in a form which is useful for diagnosis by a physician.

For example, a magnetic field is used by MRI scanners to align the nuclear spins of atoms as part of the procedure for producing images within the body of a patient. This magnetic field is referred to as the B0 field. During an MRI scan, Radio Frequency (RF) pulses generated by a transmitter coil cause perturbations to the local magnetic field and can be used to manipulate the orientation of the nuclear spins relative to the B0 field. RF signals emitted by the nuclear spins are detected by a receiver coil, and these RF signals are used to construct the MRI images.

For many clinical applications, regions of interest are delineated by an operator in the medical image data to aid the physician with his or her diagnosis of the patient. For MRI, examples of applications include:

Measuring aneurysm, tumor, or brain size. This information is often tracked over a period of time by performing multiple MRI examinations.

Defining a volume in the medical image data containing a blood vessel structure before making a Maximum Intensity Projection.

Automatically delineating nerve fiber bundles.

Delineating regions of interest is usually done manually by the operator and as such is a tedious job. Different operators will draw regions of interest in a different way leading to inter-operator variability. Furthermore, a single operator may delineate the regions of interest inconsistently over time, or between different patients leading to intra-operator variability. Such variability reduces the usefulness of diagnostic data when consistency is required, such as when the size of a tumor needs to be tracked over multiple examinations.

Alternatively, automated identification of regions of interest can be used to delineate an anatomical structure. However, the clinical delineation of these regions of interest can differ depending upon the preference of the radiologist with respect to shape, size, location. For example, the region of interest boundary may be located in between contrast boundaries, which are typically extracted using a segmentation algorithm. Furthermore automated segmentation algorithms only function properly if the image used for the automated segmentation has the contrast characteristics required by the segmentation algorithm.

U.S. Patent application 2008/0103383 describes acquiring an MRI image that is optimized for a particular target structure along with an alignment scout image.

SUMMARY OF THE INVENTION

The invention provides for a method, computer program product, and an apparatus for acquiring medical image data with at least one region of interest with a predefined, freely shaped geometry. Embodiments of the invention are given in the dependent claims.

Embodiments of the invention overcome the aforementioned limitations by combining the advantages manual delineation of regions of interest and the advantages of using algorithms for automating the identification of regions of interest. Segmentation algorithms can be used for automating the identification of regions of interest. In other words, embodiments of the invention may mitigate the disadvantages of both:

manual delineation of regions of interest, which is tedious and prone to inconsistency automated segmentation, which may result in a different region of interest than preferred by the operator and which needs image information with specific requirements concerning contrast characteristics.

With the currently available technology, it is possible for an operator to train a system to position box-shaped geometries in a medical image according to the specific preferences of the system user. For this training, the technology makes use of (i) automated anatomy detection by means of segmenting a coarse survey image covering the anatomy of interest and of (ii) box-shaped example geometries provided by the operator. From this training, the system learns the desired way of positioning box-shaped geometries dependent on results of the automated anatomy detection.

Embodiments of the invention may improve upon the use of box-shaped geometries in one or more of the following aspects:

1. Similar to this currently available technology for planning box-shaped geometries, embodiments of the invention may automatically identify freely shaped geometries. In one embodiment, the system makes use of (i) automated anatomy detection by means of segmenting a coarse survey image covering the anatomy of interest and of (ii) example regions of interest provided by the operator. Thus, in this embodiment the system learns the desired position and shape of these regions of interest with respect to the results of automated anatomy detection.

2. Regions of interest may be delineated on a diagnostic image rather than on a coarse survey image. This diagnostic image typically contains additional information which may be related to the shape for the region of interest which is preferred by the radiologist. Embodiments of the invention may use this additional information in the diagnostic image as the input for segmentation techniques.

3. Furthermore, embodiments of the invention may reject or accept diagnostic images as input for these segmentation techniques. The decision regarding rejection or inclusion is based on predefined requirements for contrast characteristics upon which the algorithm used to identify the region of interest is reliant.

Embodiments of the invention may perform a patient examination as follows:

1. A coarse survey image is scanned.

2. The system performs automated anatomy detection from the image resulting from step 1 using readily available segmentation techniques.

3. A diagnostic image is scanned.

4. The system uses (i) the automated anatomy detection results from step 2 and (ii) regions of interest provided by the operator together with their corresponding automated anatomy detection results. Based on this information, the system proposes a region of interest.

5. The system uses features automatically determined from the diagnostic image (step 3) to further optimize the proposed shape, position, orientation and size of the region of interest resulting from step 4.
6. The system receives data from an operator which is used to adapt the proposed shape, position, orientation and size of the region of interest resulting from step 5.
7. As part of the training for subsequent examinations, the system uses (i) the adapted region of interest from step 6, (ii) the automated anatomy detection results from step 2, and (iii) the features in the diagnostic image which are at the locations defined by the adapted region of interest from step 6.

Embodiments of the invention may be applicable hardware or software systems that generate digital images of humans, animals or materials and where arbitrarily shaped geometries are generated to delineate a part or parts of an image of these humans, animals or materials.

Embodiments of the invention may have the following features:
1. an automatically positioned, shaped, oriented, and/or sized region of interest for which the position, shape, orientation, and/or size as proposed by the device is modified after the operator has provided examples, such that the proposition increasingly resembles the examples provided by the operator, and/or
2. An automatically positioned, shaped, oriented, and/or sized region of interest for which the position, shape, orientation, and/or size changes if images become available from a diagnostic scan which is relevant for the region of interest.

Medical image data is defined herein as two or three dimensional data that has been acquired using a medical imaging scanner. A medical imaging scanner is defined herein as a apparatus adapted for acquiring information about the physical structure of a patient and construct sets of two dimensional or three dimensional medical image data. Medical image data can be used to construct visualizations which are useful for diagnosis by a physician. This visualization can be performed using a computer. Examples of technologies that can be used to construct a medical imaging scanner are: Magnetic Resonance Imaging (MRI), functional Magnetic Resonance Imaging (fMRI), diffusion Magnetic Resonance Imaging, perfusion Magnetic Resonance Imaging, Computed Tomography (CT), Positron Emission Tomography (PET), and ultrasound. In additional medical imaging technologies can be performed simultaneously or sequentially to obtain medical image data. Examples are combined MRI and PET medical imaging scanners or MRI guided High Intensity Focused Ultrasound (HIFU). Combined MRI and HIFU systems can have ultrasound transducers for acquiring medical image data in addition to the ultrasound transducer or transducers for ablating tissue.

While constructing a Maximum Intensity Projection (MIP) of medical image data, anatomical structures not relevant for performing a particular diagnosis can obscure anatomical structures that are. The term "cut-out-and-keep" is defined herein as using a region of medical image data which has been identified with a region of interest to construct the MIP. The medical image data within the region of interest is used to construct the MIP, and the medical image data outside of the MIP is ignored.

A trainable pattern recognition module is defined herein as a pattern recognition module that can be trained using a set of training images. The training images have had at least one region of interest that has been identified prior to using the image for training. A trainable pattern recognition module can be implemented by using a variety of different methods. Examples of different methods or algorithms that could be used are: Principal Component Analysis, Neural Network, CN2 algorithm, C4.5 algorithm, Iterative Dichotomiser 3 (ID3), nearest neighbor search algorithm, naive Bayes classifier algorithm, Holographic Associative Memory, or perception learning algorithm.

Embodiments of the invention provide for a method of acquiring medical image data with at least one region of interest with a predefined freely shaped geometry comprising the following steps: acquiring a first set of medical image data, identifying at least one anatomical landmark in the first set of image data, and determining at least one region of interest with the trained pattern recognition module using the at least one anatomical landmark.

This method has the advantage that using a trained pattern recognition module is more consistent than a manual operator and also relieves the operator of having to plan the at least one region of interest. This method can be applied to a variety of medical imaging modalities. These include magnetic resonance imaging, positron emission tomography, functional magnetic resonance imaging, perfusion magnetic resonance imaging, computed tomography, ultrasonic imaging and, tomography. These medical imaging techniques acquire medical image data which can be used to construct two or three-dimensional images used for the diagnosis by doctors.

The predefined freely shaped geometry can be a two-dimensional structure or it can be a three-dimensional geometric construct. In two dimensions, examples would be splines or functions fit to a geometry, or it could be a volume enclosed by a spline or other function. In three-dimensional medical imaging data, the predefined freely shaped geometry can comprise a manifold, a surface, or a volume. The geometry can be predefined by having a shape or a model which is deformed and fit to the geometry of the anatomical landmarks in the medical image data. The predefined freely shaped geometry can also be defined in terms of the geometry specified by a user that was used to train the trained pattern recognition module. In this case the shape is predefined relative to anatomical landmarks.

In another embodiment, the method further comprises the steps of acquiring a second set of medical image data and adjusting the shape or the location of the at least one region of interest with the trained pattern recognition module using the at least one anatomical landmark and a second set of medical image data. In this embodiment a second set of medical image data is used to refine the region of interest that was found using the anatomical landmarks. This has the advantage that multiple images which contain different information, have different contrast levels, or were taken at different resolutions can be used by the pattern recognition module to refine the location of the predefined freely shaped geometry within the medical image data. The two sets of medical image data can be from the same type of medical imaging scanner for example two different MRI images can be taken at different resolutions or using different pulse sequences. The different information within the two images can then be used to construct the region of interest by the trained pattern recognition module. In addition to this different medical imaging modalities can also be used, for example combined positron emission tomography and MRI imaging can be performed. Another example is the combination of ultrasound such as HIFU and magnetic resonance imaging. The imaging can be obtained with a combined scanner, or the patient could be moved between two different regions where medical imaging takes place. For example a patient could be on a patient support and moved into a magnetic resonance imaging device, and then the patient could be moved on a patient support to a HIFU ultrasound device. The HIFU ultrasound device is adapted for treating tumors and avoiding tissue with ultrasound but they also contain diagnostic ultrasound transducers. Because the patient is on a patient support the patient's geometry relative to the patient support can be clearly defined and this can be used to correlate the images taken in one medical imaging device with another one.

In another embodiment, the first set of medical image can have a first resolution, and the second set of medical image can have a second resolution. The first resolution can be below the second resolution. The first set of medical image data can be acquired as a lower resolution survey scan and the second set of medical image can be acquired as a diagnostic scan. This embodiment is advantageous, because the anatomical landmarks from the first scan can be used to help identify a region of interest in the second set of medical image data. Algorithms for identifying anatomical landmarks, such as segmentation algorithms, can be very dependent upon the contrast of the image. Identifying anatomical landmarks in the first set of medical image data can reduce need for the diagnostic medical image data to have a specific contrast level. The contrast can be chosen for the benefit of the radiologist and not the segmentation algorithm.

In another embodiment, the method of acquiring medical image data further comprises the steps of calculating a first contrast metric of the second set of medical image data, determining if the contrast metric satisfies a second predefined criterion, and performing a predetermined action if the second predetermined criterion is not satisfied. This embodiment has the advantage that the contrast of the medical image can have an effect on how well the trained pattern recognition module functions. Normally a trained pattern recognition module is trained using images which satisfy a predetermined criterion for contrast. If the contrast of an image is too different from what was used to train it, the trained pattern recognition module will not function properly. As a result this has the advantage that calculating a contrast metric is useful for ensuring that the trained pattern recognition module functions properly. A contrast metric is a method of calculating a contrast within a set of medical imaging data. This can include calculating a histogram for a portion or all of the medical image data or performing a statistical analysis of all or a portion of the medical image data. The contrast metric can be implemented using a pattern recognition module or a segmentation algorithm to identify a region of medical image data to perform the calculation or statistical analysis on.

This embodiment also includes performing a predefined operation if the second predetermined criterion is not satisfied. An example of a predefined operation that could be performed is alerting an operator if a second predefined criterion is not satisfied. This has the advantage that the operator knows that the contrast was not properly within its range when the medical image data was acquired. The system can also be configured such that the second set of medical image data is reacquired if the second predetermined criterion is not satisfied. The adjustment of the at least one region of interest can be halted if a second predetermined criterion is not satisfied. A second user interface can also can be displayed which is operable for receiving instructions from the operator. This allows the operator to manually control and adjust the at least one region of interest if the second predetermined criterion is not satisfied. All of these actions have the advantage that they allow the system to automatically compensate for or an operator to compensate for the contrast not being correct.

In another embodiment, the first set of medical image data has a contrast and the method further comprises the steps of calculating a first contrast metric of the first set of medical image data, determining if the first contrast metric satisfies a first predetermined criterion, and also performing a predefined operation which is performed if the first predetermined criterion is not satisfied. This embodiment has the same advantages as when the second predetermined criterion was not satisfied. Also, actions can be performed that are identical when the second predetermined criterion was not met also.

In another embodiment, the method further comprises the steps displaying the at least one region of interest graphically, receiving a modification to the at least one region of interest from an operator, and using the modification to perform a training step for the trained pattern recognition module. Displaying the at least one region of interest graphically is advantageous, because this allows an operator to see if the region of interest was specified properly. Receiving a modification to the at least one region of interest from the operator is advantageous, because an operator is then able to provide corrections if the trained pattern recognition module is not properly placed in the at least one region of interest. This is also advantageous because it allows the system to learn from the operator. The modifications received from the operator can be used to perform a training step for the trained pattern recognition module. This has the advantage that as the system is used in a clinical setting by an experienced operator, the system can be trained to more accurately identify regions of interest.

In another embodiment, the medical image data is magnetic resonance imaging medical data, and the at least one region of interest can be used for one of the following: measuring a tumor size, measuring an aneurism size, measuring brain size, delineating nerve fiber bundles, defining a volume within the medical image data containing vessel structures before making a maximum intensity projection, defining a boundary region through which fluid flows, and determining a shim volume. When a boundary region through which fluid flows is defined, the method also further comprises the step of calculating fluid flow through the boundary region using the medical image data. When a shim volume is defined, the method further comprises the step of acquiring additional medical image data using the shim volume. Performing any of these actions is advantageous, because they all require the identification of regions of interest which is time consuming for human operators. Human operators also have inter-operator and intra-operator differences in the definition of regions of interest, which can lead to differences in diagnosis. For instance, this can lead to a mistake in measuring tumor size over several examinations.

In another embodiment, the at least one region of interest is used for generating planning data for planning the acquisition of additional medical image data. This is advantageous, because embodiments of the method can be integrated into an automatic planning scheme. Automatic scan planning schemes are advantageous because the operator does not need to take time to plan the various scans for instance if the region of interest can be used to define an organ or region which the radiologist would like to investigate further.

In another aspect, embodiments of the invention provide for a computer program product comprising a set of computer executable instructions for performing the method of any of the previously described embodiments of the method. This has the advantage that the method can be performed more rapidly than a human could.

In another aspect, embodiments of the invention provide for an apparatus for acquiring medical image data with at least one region of interest with a freely defined shaped geometry.

The previously described medical imaging modalities and the combination of different medical imaging modalities can be applied to this embodiment also. The definition of different types of medical imaging data is also applicable to this embodiment too. The apparatus comprises an acquisition means adapted for acquiring a first set of medical image data, an identification means adapted for identifying at least one anatomical landmark in the first set of image data, and a trained pattern recognition module adapted for determining the at least one region of interest with a trained pattern recognition module using the at least one anatomical landmark. This apparatus has the same advantages as the previously described method.

In another embodiment, the acquisition means is further adapted for acquiring a second set of medical image data and the pattern recognition module is further adapted for adjusting location and/or shape of the at least one region of interest using the at least one anatomical landmark and the second set of medical image data. This embodiment has the same advantages as the previously described method. The apparatus can be implemented using the same techniques and can be implemented using the same imaging modalities and combination of imaging modalities that was described previously.

In another embodiment, the second set of medical image data has a contrast and the apparatus further comprises a second contrast metric calculation means adapted for calculating a second contrast metric of the second set of medical image data, a second determination means for adapted determining if the second contrast metric satisfies a second predetermined criterion, and a second alert means adapted for alerting an operator if the second predetermined criterion is not satisfied. The advantages of this and a description of the actions that can be taken if the second predetermined criterion is not met have been previously described.

In another embodiment, the first set of medical image data has a contrast and the apparatus further comprises a first contrast metric calculation means adapted for calculating a first contrast metric of the first set of medical image data, a first determination means for determining if the first contrast metric satisfies a first predetermined criterion and also taking at least one action if this first predetermined criterion has not been met. The advantages of this embodiment and the actions which can be taken if the first predetermined criterion is not met have been previously described.

In another embodiment, the apparatus further comprises a third display means adapted for displaying the at least one region of interest graphically, a modification receiving means adapted for receiving a modification to the at least one region of interest from an operator, and a training means adapted for using the modification to perform a training step for the trained pattern recognition module. The advantages and implementation of this embodiment has been previously described.

In another embodiment, the apparatus is adapted for acquiring MRI medical image data and the trained pattern recognition module is further adapted for using the at least one region of interest for one of the following: measuring a tumor size, measuring an aneurism size, measuring brain size, automatically delineating the nerve fiber bundles automatically, removing blood vessel structures from the medical image data before making a maximum intensity projection, defining a boundary region through which the fluid flows, and determining a shim volume. If a boundary region through which fluid flows is defined, the apparatus further comprises a calculation means adapted for calculating fluid flow through the boundary region using MRI medical image data, The medical image acquisition means is further adapted for acquiring additional medical image data in the case that a shim volume is determined. The advantages of this embodiment have previously been described.

In another embodiment the pattern recognition module is further adapted for generating a set of planning data using the at least one region of interest for planning the acquisition of additional medical image data and the image acquisition means is further adapted for acquiring additional medical image data using the set of planning data. The advantages of this embodiment have previously been discussed.

BRIEF DESCRIPTION OF THE DRAWINGS

In the following preferred embodiments of the invention will be described, by way of example only, and with reference to the drawings in which.

DETAILED DESCRIPTION

Figure 1:
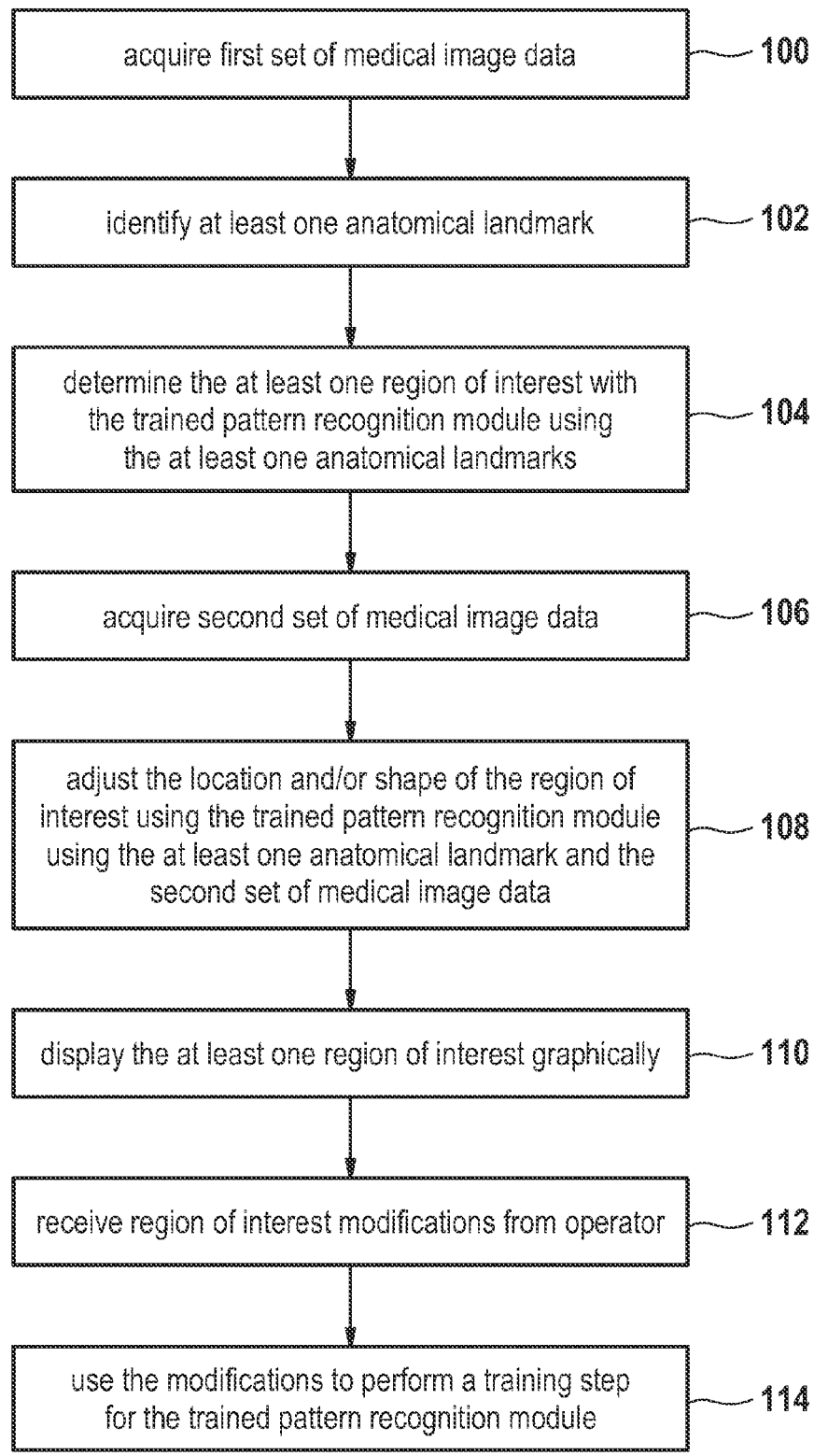
FIG. 1 an embodiment of a method according to the invention.

FIG. 1 shows an embodiment of a method of a acquiring medical image data with at least one region of interest with a predefined freely shaped geometry. The method comprises acquiring a first set of medical image data 100, identifying at least one anatomical landmark 102, determining the at least one region of interest with the trained pattern recognition module using the at least one anatomical landmark 104, acquiring a second set of medical image data 106, adjusting the location and/or shape of the at least one region of interest using the at least one anatomical landmark and the second set of image data 108, displaying the at least one region of interest graphically 110, receiving region of interest modifications from an operator 112, and using the modifications to perform a training step for the trained pattern recognition module 114. The first set of medical image data can be acquired using a variety of different image modalities such as magnetic resonance imaging, positron emission tomography, computer tomography, or other medical imaging techniques.

The at least one anatomical landmark is identified 102 using a segmentation algorithm or other identification algorithm. A trained pattern recognition module is then used to identify the at least one region of interest using the at least one anatomical landmark 104. The trained pattern recognition module can be implemented using the previously described techniques. Next, a second set of medical image data is acquired 106. This can be the same medical imaging technique that was used to acquire the first image, or it can be with a different medical imaging technique. This was previously described. This second set of medical image data is then used by the trained pattern recognition module with the second set of medical image data and the anatomical landmarks to revise the position and/or shape of the at least one region of interest.

To check the region of interest, the region of interest is displayed graphically 110. This can be displayed on a computer monitor with a graphical user interface. The operator can then examine the at least one region of interest and decide if it is correct or it should be refined. The next step is to receive the modifications from an operator to the regions of interest. This can be implemented using the graphical user interface where the operator modifies the region of interest in the interface with a mouse. In the final step the trained pattern recognition module is trained using the modifications that were received from the operator. This has the effect that the modifications can be used to adjust the determination of the regions of interest to the preferences of the physician. When the trained pattern recognition module has received enough training, the system can be used without the training step. The training can be done using a training step by the radiologist or operator in a hospital or it can be performed at a different site and then the module can be transferred to a different hospital or site. This is one reason why the contrast metrics for the first image or for the second image are important. The contrast of the images affects the functioning of the trained pattern recognition module. Having a control on the contrast or at least checking to make sure the contrast is within some predetermined criterion allows the trained pattern recognition module to function properly.

Figure 2:
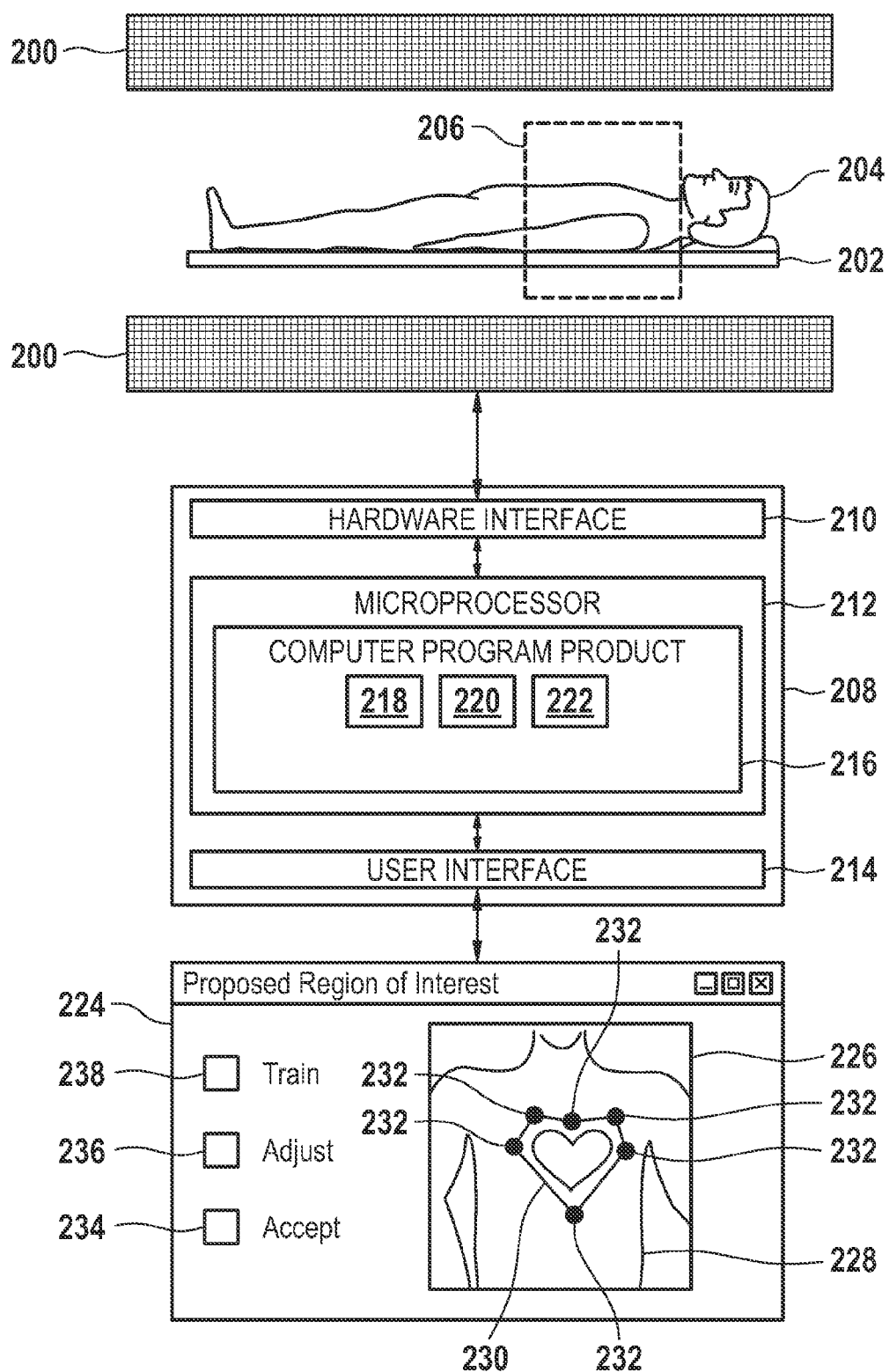
FIG. 2 an embodiment of an apparatus according to the invention.

FIG. 2 shows an embodiment of an apparatus according to an embodiment of the invention. There is an acquisition means 200, which is adapted for acquiring medical image data within an acquisition zone 206. This figure shows a patient 204 on a patient support 202. A portion of the patient 204 is within the acquisition zone 206. This region of the patient is then able to be imaged by the acquisition means 200. There is a control unit 208 which is adapted for controlling the acquisition means 200 and also for analyzing medical imaging data which it receives from the acquisition means 200. Medical imaging techniques such as magnetic resonance imaging or positron emission tomography the data acquired by the acquisition means is not in a form which humans can understand. In this case an analysis of the data is required to reconstruct images which can be interpreted by a human operator.

In MRI, Fourier integrals are used to construct slices or volumes of medical image data of the patient using data obtained by the MRI scanner. The control unit 208 contains a hardware interface 210, a microprocessor 212 and a user interface 214. The hardware interface 210 communicates with the acquisition means 200. The hardware interface 210 is able to send commands and also to receive data from the acquisition means 200. The hardware interface 210 also communicates with the microprocessor 212. The microprocessor 212 can be a computer, the microprocessor 212 has a computer program product 216 which comprises machine executable instructions. The computer program product 216 is adapted for operating the acquisition means 200 and also for analyzing medical imaging data and transforming it into a form which an operator is able to interpret or that a radiologist is able to use for diagnosing a patient. The computer program product contains executable computer instructions which comprise an identification means 218. This can be a segmentation routine or other routine which can be used for identifying local landmarks. The computer program product also comprises a trained pattern recognition module 220. Ways of implementing this and advantages of the trained pattern recognition module has already been discussed.

The computer program product also comprises a training means 222. The training means 222 can be a portion of the trained pattern recognition module 220 or it can be separate executable computer instructions which are adapted for modifying the trained pattern recognition module or any data which the trained pattern recognition module 220 uses. There is a user interface 214 which interacts with the microprocessor 212. The user interface 214 comprises a surface suitable for displaying information to an operator and also adapted for receiving input from an operator. This can be implemented using a computer monitor, keyboard, and a mouse.

An exemplary dialogue box for a graphical user interface 224 is shown. Graphical user interface 224 displays a display means 226 which is adapted for displaying medical image data 228. The display means 226 also shows region of interest 230 superimposed over the medical image data 228. This allows an operator to see the relation of the region of interest 230 to the medical image data 228. The region of interest 230 also has a modification receiving means 232. In this embodiment there are markers on the graphical user interface 224 which can be moved by a computer mouse. The operator can drag and click on any of the modification receiving means 232. There are also a series of buttons 234, 236, 238 in the graphical user interface 224. During operation the system can acquire the medical image data 228 and then display a proposed region of interest 230. If the operator is satisfied with this region of interest 230 the operator can click the accept button 234. If the operator is not satisfied with the region of interest 230 the operator can click the adjust button 236. The operator can then manipulate any of the modification receiving means 232 with a computer mouse. When the operator is finished the operator can click the train button 238. After the train button has been clicked, the training means 222 then performs a training step on the trained pattern recognition module 220. During subsequent examinations, the training step that was just performed will improve the automatic placement of the region of interest 230.

Figure 3:
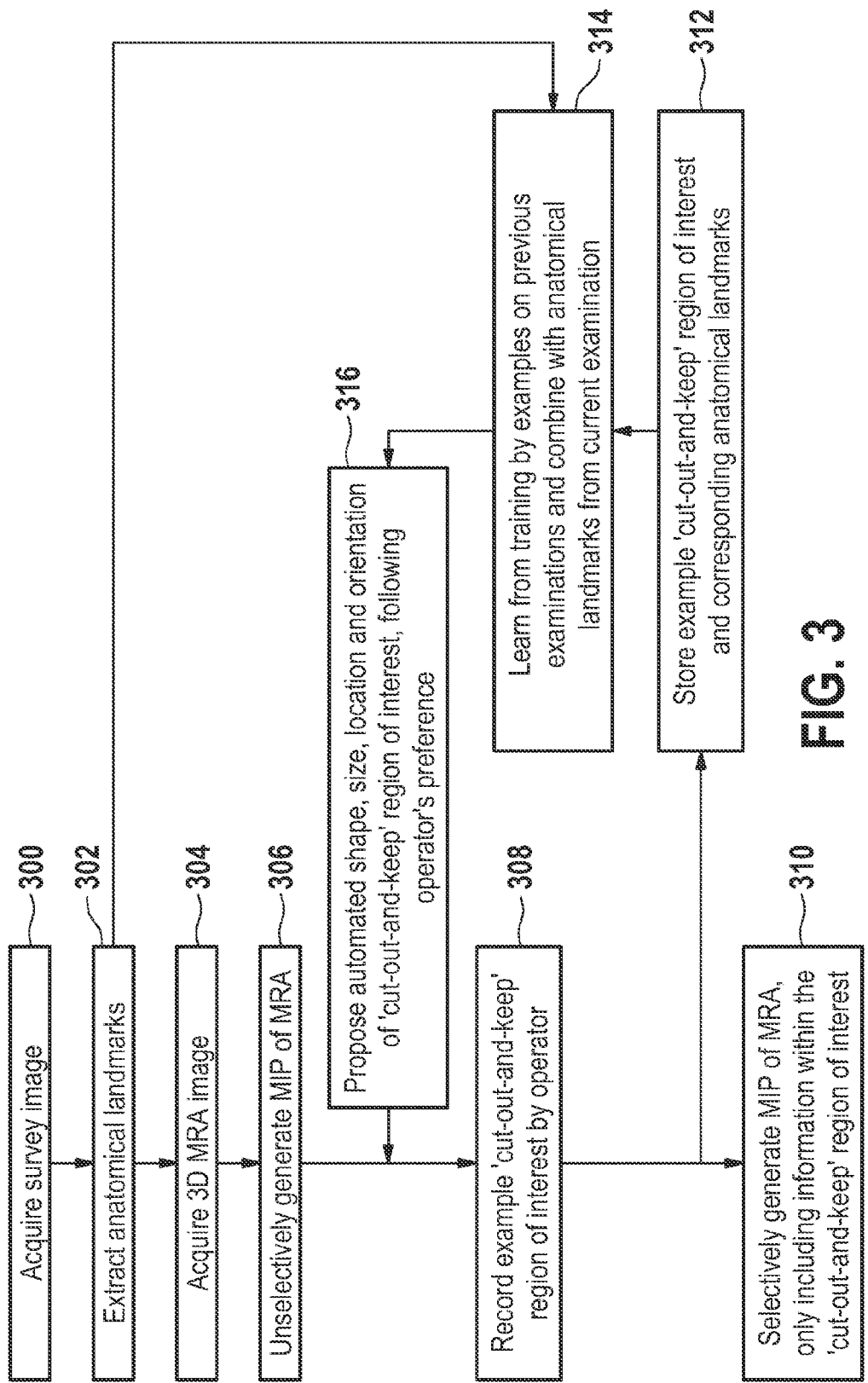
FIG. 3 an embodiment of a method according to the invention.

FIG. 3 shows an embodiment of a method of the invention for constructing maximum intensity projection plots of a three-dimensional magnetic resonance angiography dataset. It shows the process by which the system learns to propose automated shape, size, location and orientation of a 'cut-out-and-keep' region of interest based on automated anatomy detection and following the preference of the operator.

Intracranial vessel structures are usually visualized by means of a Maximum Intensity Projection (MIP) of a three-dimensional (3D) Magnetic Resonance Angiography (MRA) datasets. The original 3D MR Angiography dataset comprises more anatomy information than is relevant for diagnosis of the vessel structures. If the MIP were generated unselectively from the entire 3D MRA dataset, some of the irrelevant anatomy information, like information from the skull or from the eyes may hamper a clear view on of the relevant anatomical structures. To enable a clear view of the relevant anatomical structures, a so-called 'cut-out-and-keep' region of interest is used to distinguish the relevant anatomical structures from the irrelevant anatomical structures. Commonly, the 'cut-out-and-keep' region of interest is defined manually using MIP's in multiple orientations, generated unselectively from the entire 3D MRA dataset.

Embodiments of the invention can automate process of determining the position, shape, orientation, and size of a 'cut-out-and-keep' region of interest for a MIP of an intracranial MRA. Example 'cut-out-and-keep' regions of interest by one or more operators on intracranial MRA datasets of several examinations and the corresponding automatically detection results serve as training for the system. Using this training, the system learns the desired way of positioning and shaping these regions of interest dependent on automated anatomy detection results. For similar examinations, the system uses automated anatomy detection results to propose an automated shape, size, location and orientation of a 'cut-out-and-keep' region of interest for a MIP of the intracranial MRA dataset, following the preference of the one or more operators as learned from the training.

In this embodiment, two magnetic resonance imaging images are acquired. First a survey image is acquired 300. Anatomical landmarks are extracted 302 from the survey image. Anatomical landmarks can be extracted using standard segmentation algorithms, the selection of which depends upon the anatomy being examined. The landmarks can also be constructed using a self-registration algorithm. In this technique multiple survey images are averaged and then landmarks are identified on the averaged image. The technique can also works by identifying anatomical landmarks in a single survey image if the survey scan comes from a patient with average or normal anatomy. Artificial images that can be used by the self-registration algorithm can be illustrated by a human using a knowledge of anatomy. The self-registration algorithm is then able to locate landmarks in the acquired survey image that identify the anatomical structures of interest. Next, a three-dimensional magnetic resonance angiography dataset image is acquired 304. This shows additional structure in the blood vessels. The survey image is used for acquiring anatomical landmarks, and then the MRA image is used for acquiring specific information about the blood vessels. Next, a Maximum Intensity Projection (MIP) is then generated from the three-dimensional MRA 306 using the entire 3D MRA image. This can lead to a MIP which is limited to the bright pixels or those which are saturated.

Next, the operator defines a cut-out-and-keep region of interest. The operator defines a likely region of interest which contains the blood vessels of interest to the physician. If the image is sufficient for generating an image useful for the radiologist then in the final step a selectively generated MIP of the MRA only information within the region of interest is generated 310. This image is then used by the radiologist for diagnosis. However, initially the trained pattern recognition module needs to be trained. In this case, the key region of interest is stored with the corresponding anatomical landmarks 312. This is then used to train the trained pattern recognition module 220 using the cut-out-and-keep regions and the anatomical landmarks which were extracted in a diagram. During step 302, information about the anatomical landmarks can be supplied to the trained pattern recognition module for step 314.

Next, proposed automated shape, size and location and orientation of the cut-out-and-keep regions is suggested 316. When the system has already been trained, the system goes directly from the unselected generated MIP of the MRA step 306 to step 316. After the proposed automated step proposed shape, size and location is displayed to the operator, the operator can then record examples of the cut-out-and-keep region again 308. This process is repeated until images which are sufficient for diagnosis are generated. When the diagnosis images are prepared then the final step is 310 which has been previously discussed.

Figure 4:
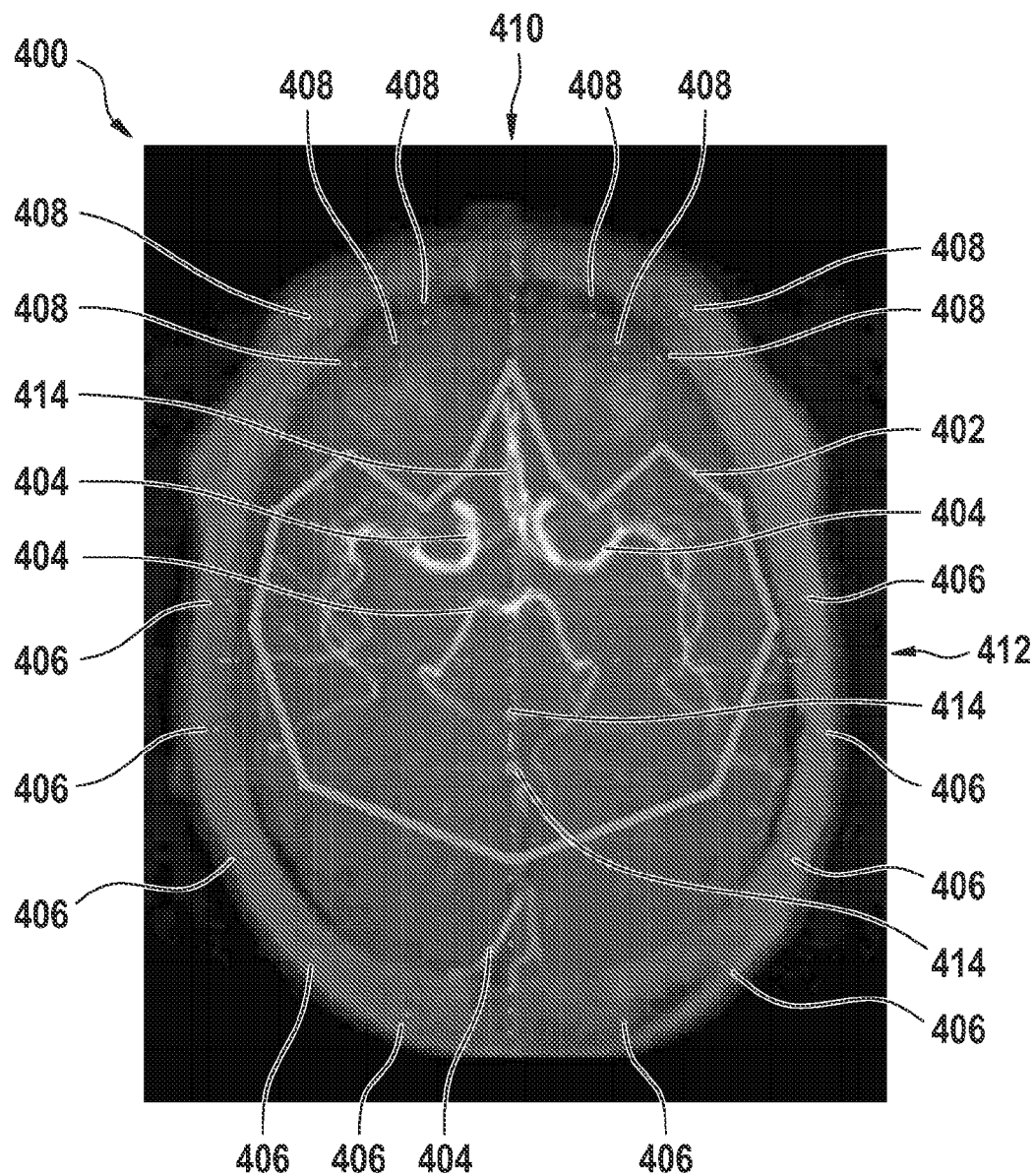
FIG. 4 an axial slice of a three dimensional maximum intensity projection magnetic resonance angiography medical image data showing a region of interest, FIG. 5 a slice of MRI medical image data showing the transverse plane of a thorax and a shim volume.

FIG. 4 Axial MIP of a 3D MRA dataset, with automatically found anatomical landmarks and an automatically shaped and positioned 'cut-out-and-keep' ROI, derived from these landmarks and example 'cut-out-and-keep' ROI's from previous examinations, used to avoid irrelevant anatomical structures from blocking the view on relevant vessel structures.

FIG. 4 shows a slice of an actual MIP of a three-dimensional MRA magnetic resonance imaging dataset 400. In this figure the region of interest 402 is visible. Square shaped markers 406, 408, 410, 412, 414 in the image are anatomical landmarks. There are anatomical landmarks corresponding to the cerebral cortex 406, there are also anatomical landmarks corresponding to the location of the eye 408. This image shows just one slice of a three-dimensional MRI image but the anatomical landmarks that have been identified are projected onto the plane that forms this slice.

Larger markers indicate anatomical landmarks that are in the plane of the current slice 414. There is also a vertical row of anatomical landmarks which are in the sagittal plane 410. There is a second horizontal row of anatomical landmarks which are in the coronal plane 412. The blood vessels 404 which are to be studied by the radiologist are located within the region of interest 402. Regions of interest are also identified in the sagittal and coronal planes. The volume formed by the intersection of these three regions of interest is then the volume which is used for the three-dimensional maximum intensity projection. The diagrams for the sagittal and coronal planes can also be constructed, but are not shown here.

Figure 5:
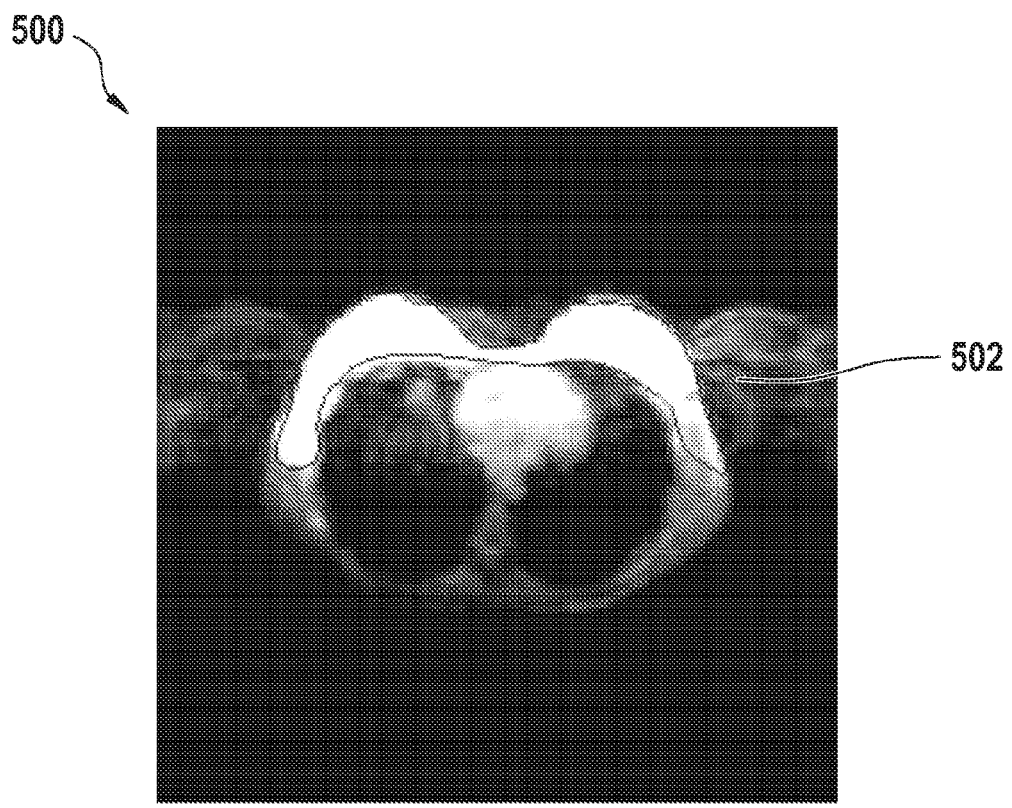

FIG. 5 shows one slice of a series of MRI image data showing the transverse plane of a thorax. In one embodiment of the invention, the region of interest is located and this region of interest is then used to locate the position of a shim volume. The shimming coils of the MRI system are used to compensate for inhomogeneities of magnetic field within a shim volume 502 caused by the object or patient being examined or by magnetic inhomogeneity imperfections in the MRI system. Shimming increases the homogeneity of the magnetic field and thus ensures that MRI images represent the object or patient being examined more accurately. Typically a three-dimensional volume is imaged by taking a number of slices. To shim the volume properly an operator needs to go through and define a region of interest in all of the slices. To perform this, the operator would take the MRI image data 500 and manually place a region of interest 502 on every slice.

This is tedious and can lead to inconsistencies due to differences in operators and also differences that one operator would make. The advantage of doing this automatically using the method described is that it will save the operator time and be more consistent. All of the slices which comprise the MRI image data then have the region of interest placed 502 and then this is used to define a shim volume, which is then used to calculate the proper currents used for the shimming gradient coils. After this has been performed, then additional MRI data is acquired using the shim volume that was defined.

LIST OF REFERENCE NUMERALS

100 Acquire first set of medical image data
102 Identify at least one anatomical landmark
104 Determine the at least one region of interest with the trained pattern recognition module using the at least one anatomical landmarks
106 Acquire second set of medical image data
108 Adjust the location and/or shape of the at region of interest using the at least one anatomical landmark and the second set of medical image data
110 Display the at least on region of interest graphically
112 Receive region of interest modifications from operator
114 Use the modifications to perform a training step for the trained pattern recognition module
200 Acquisition means
202 Patient support
204 Patient
206 Acquisition zone
208 Control unit
210 Hardware interface
212 Microprocessor
214 User interface
216 Computer program product
218 Identification means
220 Trained pattern recognition module 222 Training means
224 Graphical user interface
226 Display means
228 Medical image data
230 Region of interest
232 Modification receiving means
234 Accept button
236 Adjust button
238 Train button
300 Acquire survey image
302 Extract anatomical landmarks
304 Acquire 3D MRA image
306 Unselectively generate MIP of MRA
308 Record example 'cut-out-and-keep' region of interest by operator
310 Selectively generate MIP of MRA, only including information within the 'cut-out-and-keep' region of interest
312 Store example 'cut-out-and-keep' region of interest and corresponding anatomical landmarks
314 from training by examples on previous examinations and combine with anatomical landmarks from current examination
316 Propose automated shape, size, location and orientation of 'cut-out-and-keep' region of interest, following operator's preference.
400 Axial MIP of a 3D MRA MRI dataset
402 Region of interest
404 Blood vessel
406 Anatomical landmark indicating cerebral cortex
408 Anatomical landmark indicating eye
410 Anatomical landmarks identified in sagittal plane
412 Anatomical landmarks indentified in coronal plane
414 Anatomical landmarks identified in current slice
500 MRI image data showing transverse plane of thorax
502 Region of interest

The invention claimed is:

1. A method of acquiring medical image data with at least one region of interest with a predefined freely shaped geometry comprising the following steps:
    acquiring a first set of medical image data, wherein the first set of medical image data is coarse survey image data;
    identifying at least one anatomical landmark in the first set of image data;
    determining the at least one region of interest with a trained pattern recognition module using the at least one anatomical landmark;
    acquiring a second set of medical image data, wherein the second set of medical image data is diagnostic image data; and
    adjusting the location and/or shape of the at least one region of interest with the trained pattern recognition module using the at least one anatomical landmark and the second set of medical image data.

2. The method of claim 1, wherein the second set of medical image data has a contrast, the method further comprises:
    calculating a second contrast metric of the second set of medical image data;
    determining if the contrast metric satisfies a second predetermined criterion; and
    alerting an operator if the second predetermined criterion is not satisfied and/or reacquiring the second set of medical image data if the second predetermined criterion is not satisfied and/or halting the step of adjusting the at least one region of interest if the second predetermined criterion is not satisfied and/or displaying a second user interface operable for receiving instructions from an operator which allows the operator to manually control the adjusting of the at least one region of interest if the second predetermined criterion is not satisfied.

3. The method of claim 1, wherein the first set of medical image data has a contrast, the method further comprises:
    calculating a first contrast metric of the first set of medical image data;
    determining if the first contrast metric satisfies a first predetermined criterion; and
    alerting an operator if the first predetermined criterion is not satisfied and/or reacquiring the first set of medical image data if the first predetermined criterion is not satisfied and/or halting the step of determining the at least one region of interest if the first predetermined criterion is not satisfied and/or displaying a first user interface operable for receiving instructions from an operator which allows the operator to manually control the determining of the at least one region of interest if the first predetermined criterion is not satisfied.

4. The method of claim 1, further comprising the steps:
    displaying the at least one region of interest graphically;
    receiving a modification to the at least one region of interest from an operator; and
    using the modification to perform a training step for the trained pattern recognition module.

5. The method of claim 1, wherein the medical image data is MRI medical image data, wherein the at least one region of interest is used for at least one of the following:
    measuring a tumor size;
    measuring an aneurysm size;
    measuring brain size;
    delineating nerve fiber bundles;
    selecting volumes with blood vessel structures from the medical image data for making a maximum intensity projection;
    defining a boundary region through which fluid flows, the method further comprising the step of calculating fluid flow through the boundary region using the medical image data; and
    determining a shim volume, the method further comprising the step of acquiring additional medical image data using the shim volume.

6. A computer program product stored on a non-transitory computer-readable medium comprising a set of computer executable instructions for performing the method of claim 1.

7. An apparatus for acquiring medical image data with at least one region of interest with a predefined freely shaped geometry comprising:
    an acquisition means adapted for acquiring a first set of medical image data, wherein the first set of medical image data is coarse survey image data;
    an identification means adapted for identifying at least one anatomical landmark in the first set of image data; and
    a trained pattern recognition module adapted for determining the at least one region of interest with a trained pattern recognition module using the at least one anatomical landmark,
    wherein the acquisition means is further adapted for acquiring a second set of medical image data, wherein the second set of medical image data is diagnostic image data, wherein the trained pattern recognition module is further adapted for adjusting the location and/or shape of the at least one region of interest using the least one anatomical landmark and the second set of medical image data.

8. The apparatus of claim 7, wherein the second set of medical image data has a contrast, the apparatus further comprising:

a second contrast metric calculation means adapted for calculating a second contrast metric of the second set of medical image data;

a second determination means adapted for determining if the second contrast metric satisfies a second predetermined criterion; and a second alert means adapted for alerting an operator if the second predetermined criterion is not satisfied and/or a second reacquisition means adapted for reacquiring the second set of medical image data if the second predetermined criterion is not satisfied and/or a second halting means adapted for halting the trained pattern recognition module from adjusting the at least one region of interest if the second predetermined criterion is not satisfied and/or a second display means for adapted displaying a user interface operable for receiving instructions from an operator which allows the operator to manually control the determining of the at least one region of interest if the second predetermined criterion is not satisfied.

9. The apparatus of claim 7, wherein the first set of medical image data has a contrast, the apparatus further comprising:

a first contrast metric calculation means adapted for calculating a first contrast metric of the first set of medical image data;

a first determination means adapted for determining if the first contrast metric satisfies a first predetermined criterion; and a first alert means adapted for alerting an operator if the first predetermined criterion is not satisfied and/or a first reacquisition means adapted for reacquiring the first set of medical image data if the first predetermined criterion is not satisfied and/or a first halting means adapted for halting trained pattern recognition module for determining the at least one region of interest if the first predetermined criterion is not satisfied and/or a first display means for adapted displaying a user interface operable for receiving instructions from an operator which allows the operator to manually control the determining of the at least one region of interest if the first predetermined criterion is not satisfied.

10. The apparatus of claim 7, further comprising:

a third display means adapted for displaying the at least one region of interest graphically;

a modification receiving means adapted for receiving a modification to the at least one region of interest from an operator; and a training means adapted for using the modifications to perform a training step for the trained pattern recognition module.

11. The apparatus of claim 7, wherein the apparatus is adapted for acquiring MRI medical image data, wherein the trained pattern recognition module is further adapted for using the at least one region of interest for at least one of the following:

measuring a tumor size;

measuring an aneurysm size;

measuring brain size;

delineating nerve fiber bundles;

selecting volumes with blood vessel structures from the medical image data for making a maximum intensity projection;

defining a boundary region through which fluid flows, the apparatus further comprising a calculation means adapted for calculating fluid flow through the boundary region using MRI medical image data; and determining a shim volume, and wherein the medical image acquisition means is further adapted for acquiring additional medical image data using the shim volume.

12. The apparatus of claim 7, wherein the at pattern recognition module is further adapted for generating a set of planning data using the at least one region of interest for planning the acquisition of additional medical image data, and wherein the image acquisition means is further adapted for acquiring additional medical image data using the set of planning data.

* * * * *